United States Patent
Bachman et al.

(10) Patent No.: US 8,661,745 B2
(45) Date of Patent: Mar. 4, 2014

(54) TRAILER SECURITY DEVICE AND SYSTEM

(75) Inventors: Todd Bachman, Parker, CO (US); Christopher B. Downs, Elizabeth, CO (US)

(73) Assignee: Western Environmental, LLC, Aurora, CO (US)

( * ) Notice: Subject to any disclaimer, the term of this patent is extended or adjusted under 35 U.S.C. 154(b) by 641 days.

(21) Appl. No.: 12/112,771

(22) Filed: Apr. 30, 2008

(65) Prior Publication Data

US 2009/0085327 A1 Apr. 2, 2009

Related U.S. Application Data

(60) Provisional application No. 60/915,033, filed on Apr. 30, 2007.

(51) Int. Cl.
*E02D 5/74* (2006.01)

(52) U.S. Cl.
USPC .............................................. 52/155; 52/156

(58) Field of Classification Search
USPC ........................ 52/155, 156, 157, 165; 232/39
See application file for complete search history.

(56) References Cited

U.S. PATENT DOCUMENTS

| | | | | | |
|---|---|---|---|---|---|
| 396,624 | A | * | 1/1889 | Thomas | 52/165 |
| 891,448 | A | * | 6/1908 | Snider | 52/157 |
| 4,852,834 | A | * | 8/1989 | Hosman | 248/156 |
| 5,192,159 | A | * | 3/1993 | Higginson | 404/11 |
| 5,404,682 | A | * | 4/1995 | West | 52/165 |
| 5,481,828 | A | * | 1/1996 | Kentrotas | 49/35 |
| 6,883,786 | B2 | * | 4/2005 | Bebendorf | 256/19 |

OTHER PUBLICATIONS

Author Unknown, Champion Trailer's Webpage for Trailer Couplers, copyright 1996 (last revision May 24, 2002), 4 pages, http://www.championtrailers.com/COUPLERS.htm.

Author Unknown, 2" Adjustable Coupler w/3-Position Channel, at least as early as Jan. 29, 2007, 2 pages, http://www.rcpw.com/trutrail/0090155.htm.

Author Unknown, 2" Adjustable Coupler w/5-Position Channel, at least as early as Jan. 29, 2007, 2 pages, http://www.rcpw.com/trutrail/0090160.htm.

\* cited by examiner

*Primary Examiner* — Basil Katcheves
(74) *Attorney, Agent, or Firm* — Dorsey & Whitney LLP (57) ABSTRACT

A trailer security system for use with a trailer having a trailer coupling member, such as a trailer coupling channel. The trailer security system may include a security device joined to the trailer coupling member, a locking device to selectively lock the security device to trailer, and security elements attached to trailer. The security device may be a security box formed from walls that define a space for receiving flanges of the trailer coupler channel. The security box may include slots for receiving the trailer coupling member flanges and may be slid onto the trailer coupling member. The security device may include a post extending from the security box for anchoring the trailer to the ground. Access to lock may be restricted by the security elements and/or the configuration of the security box and post. The security system may include other features to increase the difficulty to tamper with or disable the system.

19 Claims, 9 Drawing Sheets

TRAILER SECURITY DEVICE AND SYSTEM

CROSS REFERENCE TO RELATED APPLICATIONS

This application claims the benefit under 35 U.S.C. §119 (e) of U.S. Provisional Application No. 60/915,033 filed Apr. 30, 2007 and entitled "Trailer Security Device and System", the entirety of which is hereby incorporated by reference as if fully set forth herein.

FIELD OF INVENTION

The present invention generally relates to trailer hitch systems, and more particularly to security devices and systems for trailer hitch systems.

BACKGROUND

Trailers for moving items and equipment, such as fuel tanks, are often coupled to a vehicle using a trailer hitch system. The trailer hitch system may include a trailer hitch joined to a trailer coupler. The trailer hitch is generally joined to a vehicle, and the trailer coupler to the trailer. The trailer coupler may be attached to the trailer via a trailer coupler channel. Generally, the trailer coupler channel is fixedly attached to the trailer, and the trailer coupler is attached to the trailer coupler channel using mechanical fasteners, such as nuts and bolts, to allow the trailer coupler to be removed from the trailer when not being used.

Often, it is desirable to remove the trailer coupler to prevent an unauthorized party from removing an unattended trailer left, for example, at a job site. Removing the trailer coupler, however, is not a particularly effective theft deterrent since a trailer thief can simply bring another trailer coupler to use with the trailer coupler channel.

Accordingly, what is needed in the art is a device and system to protect an unattended trailer from theft.

SUMMARY OF THE INVENTION

One embodiment of the present invention may take the form of a trailer security system for use with a trailer. The trailer may include a trailer coupler channel or trailer coupling member including a web and first and second flanges extending in a first direction from the web. Each flange may include a plurality of holes aligned with holes in the other flange for joining a trailer coupler to the trailer. The trailer security system may include an apparatus including four walls. Each wall may be joined to at least two other walls. The four walls may define a substantially enclosed space sized for receiving at least a portion of the first and second flanges of the trailer coupler channel. At least one of the four walls may include first and second slots. Each slot may provide access to the substantially enclosed space and may be sized to receive one of the first and second flanges therethrough. Receipt of the at least a portion of the first and second flanges into the substantially enclosed space may substantially restrict access to at least one of the plurality of holes in each flange.

Another embodiment of the present invention may take the form of a trailer security system for use with a trailer. The trailer may include a coupling member including a plurality of holes for joining a trailer coupler to the trailer. The trailer security system may include an apparatus defining a substantially enclosed space sized for receiving at least a portion of the coupling member. The apparatus may include first and second slots. Each slot may provide access to the substantially enclosed space and may be sized to receive at least a portion of the coupling member therethrough. Receipt of the at least a portion of the coupling member into the substantially enclosed space substantially restricts access to at least one of the plurality of holes in the coupling member.

DETAILED DESCRIPTION

Described herein are various embodiments of a trailer security device and system. The trailer security system may include a trailer security device or apparatus selectively attachable to a trailer. The security device may include front and rear end walls joined by left and right sidewalls to form an open-ended security box. The security box may further include a cover attached to the upper ends of the end walls and sidewalls. Together, the end walls, the sidewalls, and the cover may define a security box or device space for receiving at least a portion of a coupling member, such as a trailer coupling channel, connected to the trailer. To permit the coupling member to be received within the security device space, the rear end wall, or any of the other walls, of the security box may include slots sized and configured for receiving at least a portion of the coupling member, such as the flanges of a trailer coupling channel. When at least a portion of the coupling member is received within the security device space, access to holes in the coupling member for joining a trailer coupler to the trailer coupler channel is restricted or otherwise substantially prevented, thus thwarting attachment of a trailer coupler to the trailer coupling member.

The security device may be locked to the trailer using a locking device, such as a padlock or the like. The security device may also include a security post, which may be inserted into the ground to further increase the difficulty of removing the security device from the trailer. The security post may also make it difficult to move the trailer since it may serve as an anchor and may also provide an electrical ground for the trailer. The trailer security system may further include trailer security elements fixedly joined to the trailer frame. These trailer security elements may include U-shaped members and planar plates arranged on the trailer frame to restrict access to the locking device, thus increasing the difficulty of tampering with the locking device. Employment of one or more of the various components of the security system on a trailer may increase the difficulty of moving a trailer, thus allowing the trailer to be left unattended at a job site or other location.

Figure 1:
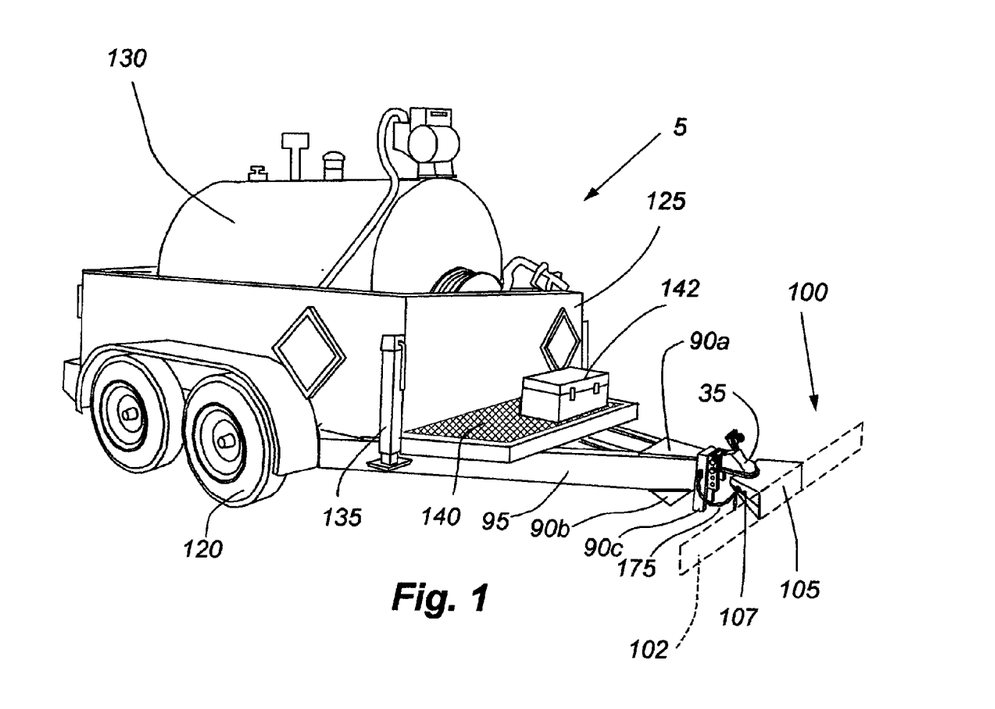
FIG. 1 is a perspective view of a trailer joined to a vehicle using a trail hitch system with the trailer including components of a trailer security system.
Figure 13:
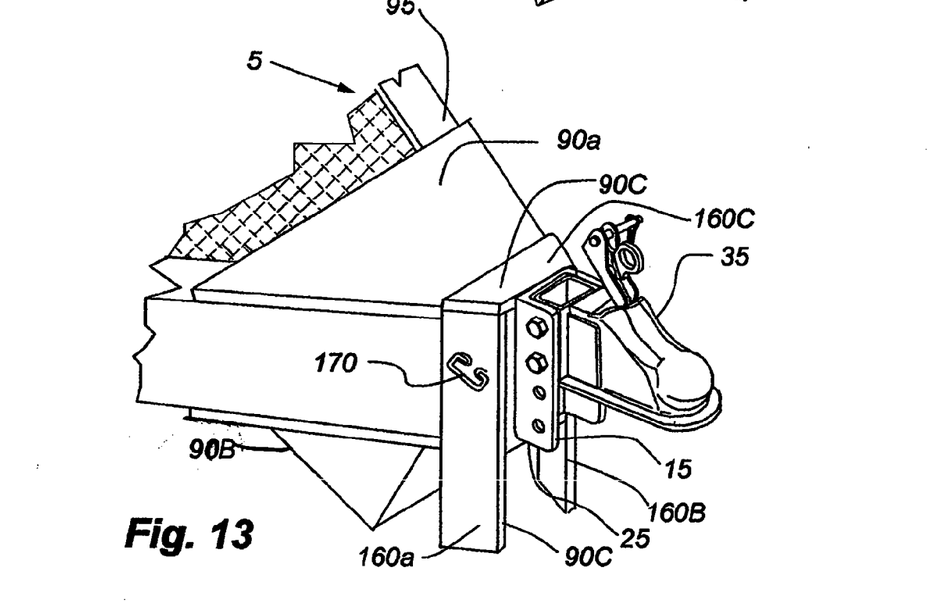
FIG. 13 is a perspective view of a front portion of a trailer with a trailer coupler attached to the trailer.
Figure 14:
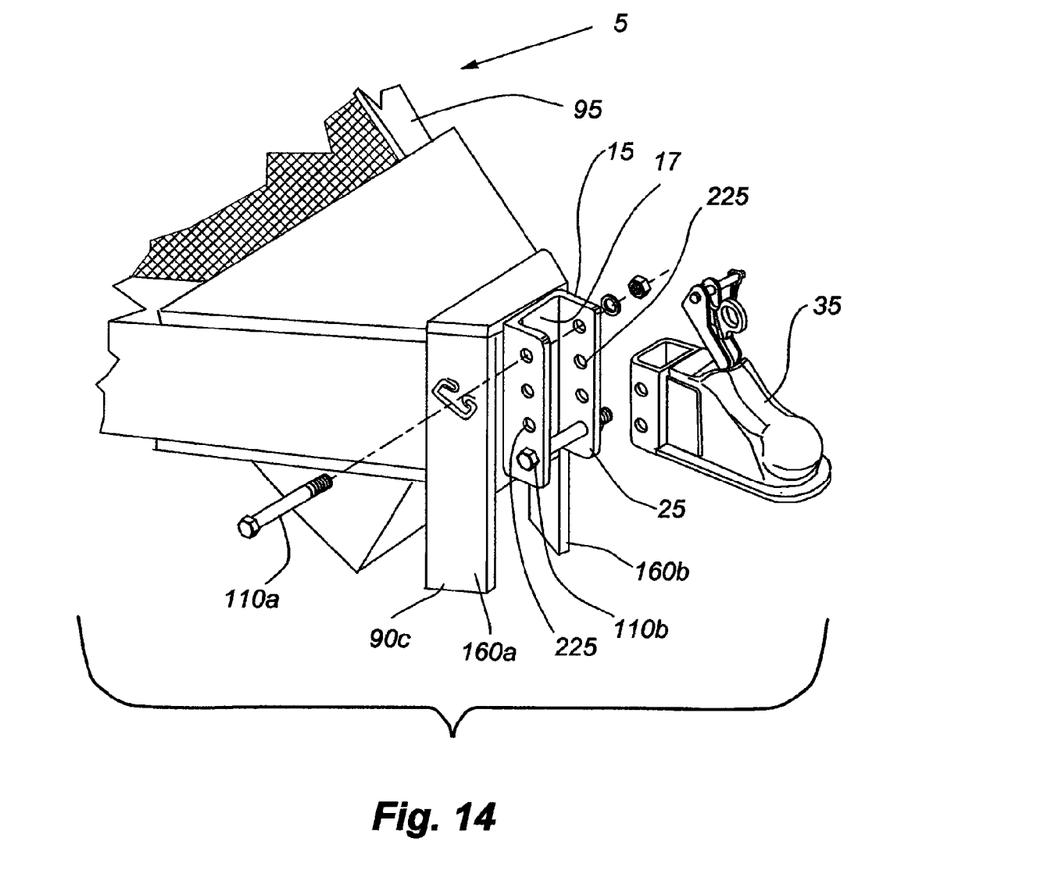
FIG. 14 is a perspective view of the front portion of the trailer of FIG. 13 with the trailer coupler detached from the trailer.

Vehicles are often joined to a trailer 5 to move the trailer 5 from one location to another location. FIG. 1 depicts a trailer 5 joined to a vehicle frame 102 using a trailer hitch system 100. The trailer hitch system 100 may include a trailer coupler 35 joined to the trailer 5 and a trailer hitch 105 joined to the vehicle (not fully shown). The trailer coupler 35 may be selectively connected and disconnected to and from the trailer hitch 105 to connect and disconnect the trailer 5 to and from the vehicle. With reference to FIGS. 13 and 14, the trailer coupler 35 may be removably joined to the trailer 5 using two or more coupler fasteners 110 received through aligned holes 225 in the trailer coupler 35 and a trailer coupling member 15, such as a trailer coupler channel. A user may desire such ease in removal of the trailer coupler 35 from the trailer 5 to readily replace a trailer coupler 35 with another trailer coupler 35, or to make it more difficult for unauthorized users to join a vehicle to the trailer when an unattended trailer is disconnected from a vehicle. The trailer coupler 35, trailer coupling member 15 (e.g., a trailer coupler channel), trailer hitch 105 and coupler fasteners 110 may be composed of a metal, such as steel, or other suitable materials.

The trailer coupling member 15 may be permanently or fixedly joined to the trailer 5. Methods for joining the trailer 5 may include welding or otherwise adhering the coupling member 15 to a trailer frame 95 of the trailer 5. In some embodiments, the trailer coupling member 15 may be removably connected to the trailer 5 using mechanical fasteners, such as nuts, bolts, screws, and so on.

Returning to FIG. 1, if desired, the trailer 5 may further include a trailer bed supported by the trailer frame 95, trailer wheels 120 operatively associated with the trailer frame 95, trailer walls 125 extending upward from the trailer bed to define a volume for receiving items, such as a fuel tank 130, trailer stanchions 135 for leveling and/or supporting the trailer, and a trailer step platform 140 for standing on or supporting items, such as a tool box 142.

Figure 2:
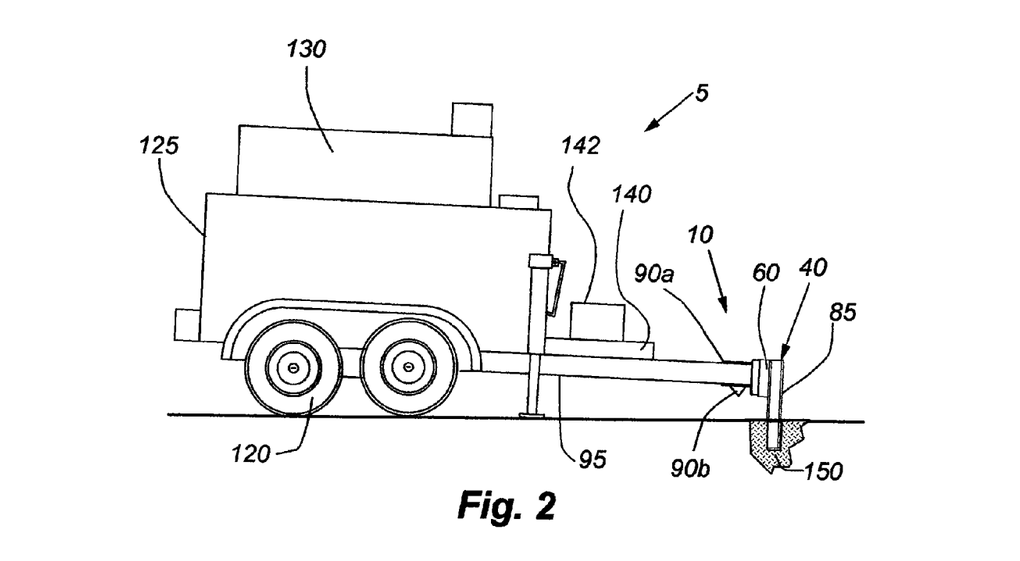
FIG. 2 is a side view of a trailer showing a first embodiment of a security device for a trailer security system joined to the trailer.
Figure 3:
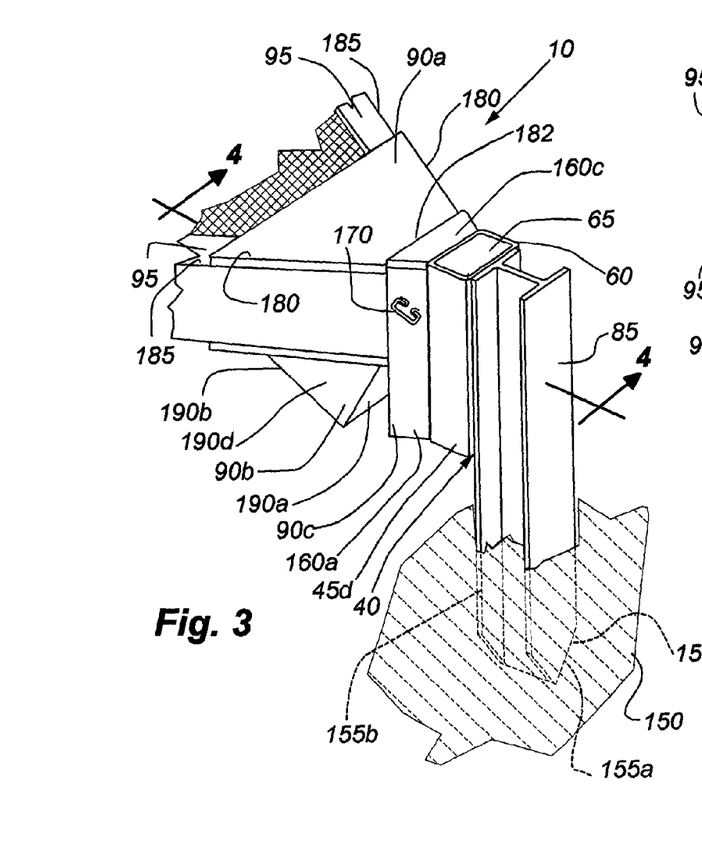
FIG. 3 is a perspective view of the trailer of FIG. 2 showing a front portion of the trailer with the security device.

FIG. 2 depicts the trailer 5 of FIG. 1 disconnected from a vehicle. Further, the trailer coupler 35 has been removed from the trailer 5 and replaced with a trailer security device 40 as shown, for example, in FIGS. 2 and 3. With reference to FIGS. 2 and 3, the trailer security device 40 may include a security post 85 extending downward from a security box 60 or other main structure. A portion of the security post 85 may extend into the ground 150, thus anchoring the trailer 5 to the ground 150 to resist unauthorized movement of the trailer 5 from its stationary position. When placed into the ground 150, the security post 85 may also act as an electric ground for a fuel tank 130 supported by the trailer 5. The security box 60 and the security post 85 may be composed of a metal, such as steel, or other generally tamper-resistant material. The security post 85 may be joined to the security box 60 by welds or by any other suitable joining mechanism, including, mechanical fasteners, adhesives, and so on, or may be integrally formed with the security box 60.

Figure 4:
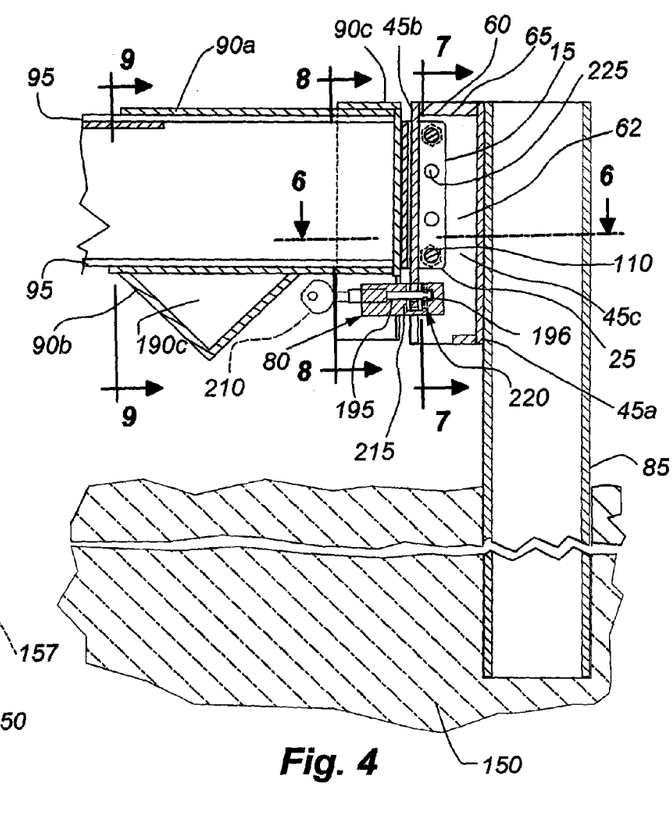
FIG. 4 is a cross-section view of the front portion of the trailer with security device, viewed along line 4-4 in FIG. 3.
Figure 7:
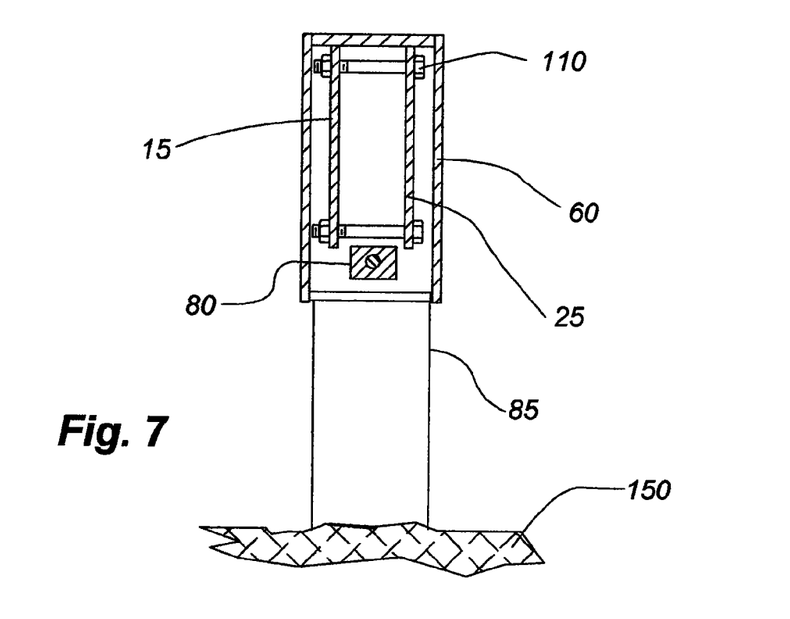
FIG. 7 is a cross-section view of the trailer with security device, viewed along line 7-7 in FIG. 4.

With reference to FIGS. 3, 4, and 7, the security box 60 may cover the flanges 25 of the trailer coupler channel 15, thus denying access to the fastener holes 225 formed within these flanges 25. As described above, these fastener holes 225 receive coupler fasteners 110 for connecting the trailer coupler 35 to the trailer coupling member 15. By covering or otherwise restricting access to these fastener holes 225 with the security box 60, an unauthorized user cannot readily use the trailer coupling member 15 to connect another trailer coupler to the trailer 5, thus making it more difficult for the unauthorized user to connect a vehicle to the unattended trailer 5 to move the trailer 5 from its location.

Returning to FIGS. 2 and 3, the security post 85 may take the form of a W-flanged or I-shaped member, or any other desired shape. Front and rear flanges 155a, 155b of the security post 85 may be cut at an angle to form a spike or other narrowed section 157 at an end portion of the security post 85. The narrowed section 157 may facilitate entry of at least a portion of the security post 85 into the ground 150. The security box 60 may include a right sidewall 45d for covering a right flange 25 of the trailer coupling member 15 and a cover 65 for preventing access to the trailer coupling member 15 from above the trailer 5. As described in more detail below, the security box 60 may further include a left sidewall 45c and front and rear end walls 45a, 45b. Each wall 45 may be joined to one or more other walls 45 by welds, or other suitable joining mechanisms, such as mechanical fasteners, adhesives, and so on. In some embodiments, a wall 45 may be integrally formed with one or more of the other walls 45 by methods such as cast molding, injection molding, and so on. The cover 65 may be similarly joined to, or integrally formed with, any or all of the walls 45.

Components of a trailer security system 10 may be removably, permanently, or relatively permanently, joined to the frame 95. For example, upper, lower and side security elements 90a, 90b, 90c may be joined to the trailer frame 95. Permanently or otherwise fixedly joining one or more of the security elements 90 to the frame 95 may increase the difficulty of disabling or otherwise defeating the security system 10. However, any of the security elements 90 may be removably affixed to the trailer 5, if desired. The security elements 90 may cooperate with a security apparatus or device 40 joined to the trailer 5 to deter theft of an unattended trailer. For example, these security elements 90 may increase the difficulty for an unauthorized user to tamper with a locking device 80, such as padlock, attached to the security device 40 to deter or otherwise prevent removal of the security device 40 from the trailer 5. The side, upper and lower security elements 90c, 90a, 90b may be composed of a metal, such as steel, or other generally tamper-resistant material.

The side security element 90c may include right side and left side security element flanges 160a, 160b extending downward from a side security element web 160c which together may define a generally U or C-shaped member 90c. Each side security element flange 160a, 160b may be joined to the side security element web 160c by welding, mechanical fastening, and so on, or may be integrally formed with the web 160c. A lower elevation of the right side security flange 160a may approximately correspond to a lower elevation of the right sidewall 45d of the security box 60. However, the lower elevation of the right side security flange 160a may be higher or lower than the lower elevation of the right sidewall 45d of the security box 60. The left side security flange 160b, as shown in FIG. 13, may be similar to the right side flange 160a and may extend a similar distance from the trailer frame 95. The side security element 90c may rest on or bear upon the upper security element 90a. In some embodiments, however, the side security element 90c may rest directly on the trailer frame 95, or may be omitted.

A loop or ring 170 may be joined to the right side security element flange 160a. A similar loop or ring 170 may also be joined to the left side security element flange 160b. With reference to FIG. 1, each loop 170 may receive a safety chain 175 connected at the chain's distal end 107 to a portion of a vehicle, such as the trailer hitch 105. The safety chain or chains 175 may maintain the connection between the vehicle and the trailer 5 in the event the trailer coupler 35 inadvertently or otherwise undesirably becomes disconnected from the trailer hitch 105.

Returning back to FIGS. 2 and 3, the upper security element 90a may take the form of a triangular or truncated triangular shaped plate, or other desired shape, connected to the trailer frame 95. Left and right edges 180 of the upper security element 90a may generally align with the outer left and right side edges 185 of the trailer frame 95. Either or both of the left and right edges 180 of the upper security element 90a, however, may extend beyond, or short of, the respective outer left and right side edges 185 of the trailer frame 95. A front portion 182 of the upper security element 90a may or may not extend beneath the side security element 90c. When extending beneath the side security element 90c, the web 160c of the side security element 90c may bear upon the upper security element 90a. When not extending beneath side security element 90c, the front edge 182 of the upper security element 90a may abut the web 160c of the side security element 90c.

The lower security element 90b may take the form of a V-shaped wedge, or any other desired shape, using one or more plates 190. The lower security element 90b may be formed into the V-shaped wedge using front, rear, and left and right plates 190a, 190b, 190c, 190d. Each plate 190 may be joined to any of the other plates 190 by welding, mechanical fastening, and so on, or may be integrally formed with any of the other plates 190. The front plate 190a may slope downward and rearward from the trailer frame 95, and the rear plate 190b may slope downward and forward from the trailer frame 95. An intersection of lower end portions of the front and rear plates 190a, 190b may define the vertex of the V. The right plate 190d may take the form of a V-shaped plate in which its front edge generally aligns with the front surface of the front plate 190a and its rear edge generally aligns with the rear surface of the rear plate 190b. The left plate 190c may be generally similar to the right plate 190d.

Figure 5:
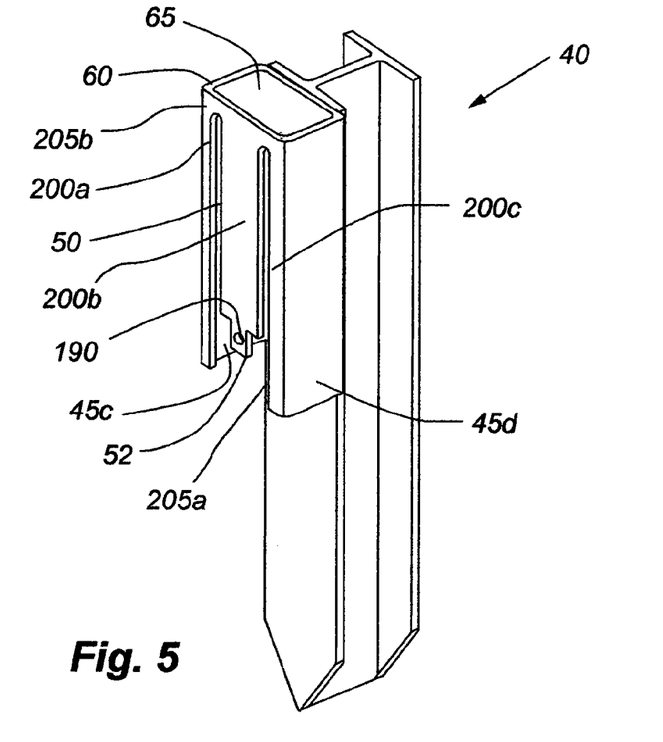
FIG. 5 is a rear perspective view of the security device of FIG. 2.

FIG. 4 depicts a cross-section view of the front portion of the trailer 5 viewed along line 4-4 in FIG. 3. FIG. 5 depicts a rear perspective view of the trailer security device 40. With reference to FIG. 4, the security box 60 may include front and rear end walls 45a, 45b joined by a left sidewall 45c and the right sidewall 45d (see FIG. 3). Together, the front and rear end walls 45a, 45b and the left and right sidewalls 45c, 45d may define a security box space or enclosure 62 for receiving at least a portion of the flanges 25 of the trailer coupling member 15. If desired, the coupler fasteners 10 may be joined to the trailer coupling member 15 when the trailer coupling member flanges 25 are received within the security box space 62.

The front end wall 45a of the security box 60 may abut the security post 85. An upper elevation of the security box 60 may approximately align with an upper elevation of the security post 85 as shown, for example, in FIG. 4, or may be above or below the upper elevation of the security post 85. The rear end wall 45b of the security box 60 may include a lock aperture 190 for receiving a locking pin 195 of the lock device 80. The locking device 80 may be a lock, such as a Master Lock™ hidden shackle lock or other suitable lock.

With reference to FIG. 5, the rear end wall 45b of the security box 60 may be formed into left, middle and right sections 200a, 200b, 200c. The left and middle sections 200a, 200b may be separated by a left slot 50, and the right and middle sections 200c, 200b may be separated by a right slot 52. Each slot 50, 52 may extend from a lower end portion 205a of the rear end wall 45b of the security box 60 to an upper end portion 205b of the rear end wall 45b of the security box 60 and may be configured to receive a trailer coupler flange 25 of the channel coupler 15 therethrough. Each slot 50, 52 may be open at its lower end, thus permitting the security device 40 to be slid onto or over the trailer coupler channel 15.

The left and right sections 200a, 200c of the rear end wall 45b of the security box 60 may extend lower than the middle section 200b, thus limiting access to the lock device 80 joined to the security device 40. The lock aperture 190 may be defined within a lower area of the middle section 200b of the rear end wall 45b of the security box 60. Further the lower area of the middle section 200b containing the lock aperture 190 may have a relatively smaller width than the remaining area of the middle portion 200b. The width in the lower area may be less than a recess in the lock device 80 through which the lock pin 195 extends, thus allowing the lock pin 195 to be aligned with the lock fastener 210, such as a lock key.

With reference to FIG. 4, the lock device 80 may prevent undesired removal of the security box 60 from the trailer coupling member 15 by engagement with the security box 60 and the trailer frame 95. Specifically, the lock pin 195 engages the rear end wall 45b of the security box 60 and a portion of a lock body 215 engages the trailer frame 95 when attempting to lift the security box 60 off the trailer coupling member 15. These engagements limit further upward movement of the security box 60 relative to the trailer coupling member 15.

Engagement of the security box walls 45 and cover 65 with the trailer coupling member 15, coupler fasteners 110 and/or trailer frame 95 restricts, or otherwise substantially prevents removal of the security box 60 from the trailer 5 when locked to the trailer coupler channel 15. For example, downward movement of the security box 60 relative to the trailer coupling member 15 may be limited by engagement of the security box cover 65 and/or the security box rear end wall 45b with the trailer coupling member flanges 25. Left or right movement (i.e., in or out of the page) may be limited by respective engagement of the left or right side walls 45c, 45d of the security box 60 with the left or right trailer coupling member flanges 25 and/or the coupler fasteners 110. Forward movement of the security box 60 relative to the trailer coupling member 15 may be limited by engagement of the security box rear end wall 45b with the coupler fasteners 110. Rearward movement of the security box 60 relative to the trailer coupling member 15 may be limited by engagement of the security box rear end wall 45b with the trailer coupling member web 17, (web shown in, for example, FIGS. 14 and 15). In short, with movement of the security box 60 relative to the trailer coupling member 15 for each direction limited, the security box 60 remains coupled to the trailer 5, thus preventing access to the trailer coupling member 15.

With continued reference to FIG. 4, a portion of the lock body 215 may be removed to define a recess for receiving an end portion of the rear end wall 45*b* of the security box 60 containing the lock aperture 190. Co-axial alignment of the lock aperture 190 with the lock pin 195 allows the lock pin 195 to be received in and removed from the lock aperture 190. When received thorough the lock aperture 190, the lock pin 195 may be received within a locking recess 220 formed in the lock body 215. Rotation of the lock pin 195 within the locking recess 220 using a lock key 210 positions a pin flange 196 to engage a rear surface defining the locking recess 220, thus preventing the pin 195 from being removed from the locking recess 220, which in turn prevents the lock pin 195 from being moved from the lock aperture 190 in the security box 60. To remove the lock pin 195 from the lock aperture 190, the lock pin 195 may be rotated relative to the locking recess 220 until the pin flange 196 ceases to engage the rear surface defining locking recess 220. The locking pin 195 may then be withdrawn from the locking aperture 190 by sliding the locking pin 195 relative to the lock body 215. Once removed from the locking aperture 190, the security box 60 may be moved relative to the trailer frame 95 to uncover the trailer coupler channel 15.

As shown, for example, in FIG. 4, the portion of the rear end wall 45*b* of the security box 60 containing the lock aperture 190 may extend sufficiently below the lower elevation of the trailer frame 95 to permit the lock 80 to be placed underneath the trailer frame 95 when co-axially aligning the lock pin 195 with the lock aperture 190. Lower portions of the front end wall 45*a* of the security box 60 and the right and left side walls 45*d*, 45*c* of the security box 60 may also extend sufficiently below the trailer frame 95 to cover at least a portion of the lock 80, thus restricting access to the lock 80 from the front, right, and left sides to limit potential tampering with it. Similarly, lower portions of the right and left flanges 160*a*, 160*b* of the side security element 90*c* may extend sufficiently beneath the trailer frame 95 and may be sufficiently wide to cover the left and right sides of the lock 80 not covered by the security box 60, thus further restricting access to the lock 80 from the right and left sides to limit potential tampering with the lock 80.

The lower security element 90*b* may extend sufficiently below the trailer frame 95 to restrict access to the rear side of the lock 80, thus restricting access to the lock 80 from the rear side to limit potential tampering with the lock 80. The downwardly and rearwardly sloping front surface 190*a* of the lower security element 90*b* may provide a space between the lower security element 90*b* and the lock 80 for a user to insert the user's hands for aligning the locking pin 195 with the lock aperture 190 in the security box 60 and for using the key 210 to move the locking pin 195 from an unlocked to locked position, and vice versa, while minimizing the space available for using a drill or other tool to tamper with the lock 80. To provide yet further security from tampering with the lock 80, the trailer stanchions 135 may be used to position the trailer frame 95 above the ground 150 a sufficient distance to increase the ease of joining the lock 80 to the security box 60 and then the stanchions 135 may be used to position the trailer frame 95 closer to the ground 150 to limit access to the lock 80.

In relatively soft soils, at least a portion of the security post 85 may be caused to enter into the ground 150 by lowering the stanchions 135 sufficiently for the trailer frame 95 to move downwards and drive the post 85 into the ground 150. In harder soils, a hole may be dug around the security post location to facilitate movement of at least a portion of the security post 85 into the ground and then backfilled after receipt of at least a portion of the post 85 within the hole. To remove the security post 85 from the ground, the stanchions 135 may be moved to raise the front end of the trailer frame 95 away from the ground, thus pulling the security post 85 out of the ground. Prior to moving the stanchions 135, soil may be removed from around the security post 85 to facilitate lifting the security post 85 out of the ground 150.

Figure 6:
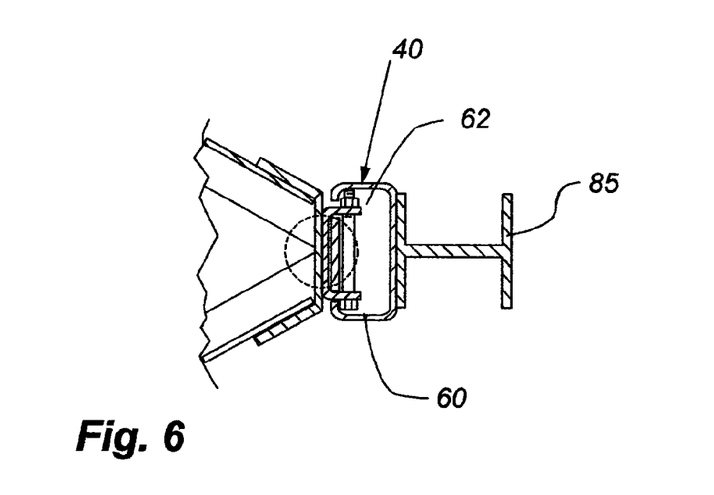
FIG. 6 is a cross-section view of the trailer with security device, viewed along line 6-6 in FIG. 4.

FIGS. 6-9 depict various cross-sectional views taken through the trailer frame 95 and/or the trailer security device 40 to show the relationship of the trailer security system 10 relative to various trailer components. With reference to FIG. 6, at least a portion of each flange 25 of the trailer coupling member 15 may be received with the security box space 62 through the right and left slots 52, 50 formed in the security box 60 of the security device 40. Portions of the right and left sections 200*c*, 200*a* of the rear end wall 45*b* of the security box 60 may be positioned proximate to at least end portions of the trailer coupler fasteners 110. These right and left sections 200*c*, 200*a* of the rear end wall 45*b* of the security box 60 may cooperate with the trailer coupler fasteners 110 to resist attempts to pry the security device 40 away from the trailer coupling member 15 by engagement of the sections 200*c*, 200*a* with the trailer coupler fasteners 110.

With reference to FIG. 7, the upper ends of the trailer coupling member flanges 25 may be proximate the security box cover 65. In such a position, the lock aperture 190 may extend sufficiently below the trailer coupling member flanges 25 to provide space for the lock 80 to occupy when joined to the security device 40. The trailer coupler fasteners 110 and at least a portion of the trailer coupler flanges 25 may be received within the security box space 62, thus generally denying access to the trailer coupler fasteners 110 and the trailer coupling member flanges 25. Preventing access to these features 110, 25 effectively hampers use of the trailer coupling member 15 while the security box 60 of the security device 40 is joined to the trailer coupler channel 15. The front and side walls 45*a*, 45*c*, 45*d* of the security box 60 may cover at least a portion of the lock 80, thus making it more difficult to access the lock 80, which, in turn, makes it more difficult to tamper with the lock 80.

Figure 8:
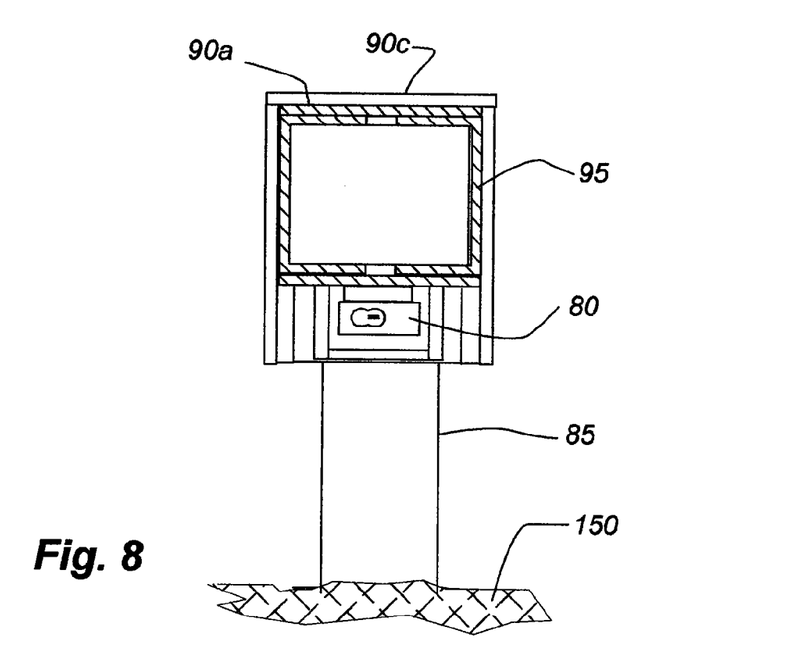
FIG. 8 is a cross-section view of the trailer with security device, viewed along line 8-8 in FIG. 4.

FIG. 8 shows the position of the lock 80 relative to the front end of the trailer frame 95. The lock 80 may generally be positioned below the lower elevation of the trailer frame 95. At least a portion of the lock 80 may be positioned underneath the trailer frame 95 such that attempts to move the locked security device 40 upward relative to the trailer coupling member 15 results in engagement between the lock 80 and the trailer frame 95, thus limiting further upward movement of the security device 40 relative to the trailer coupler channel 15.

Figure 9:
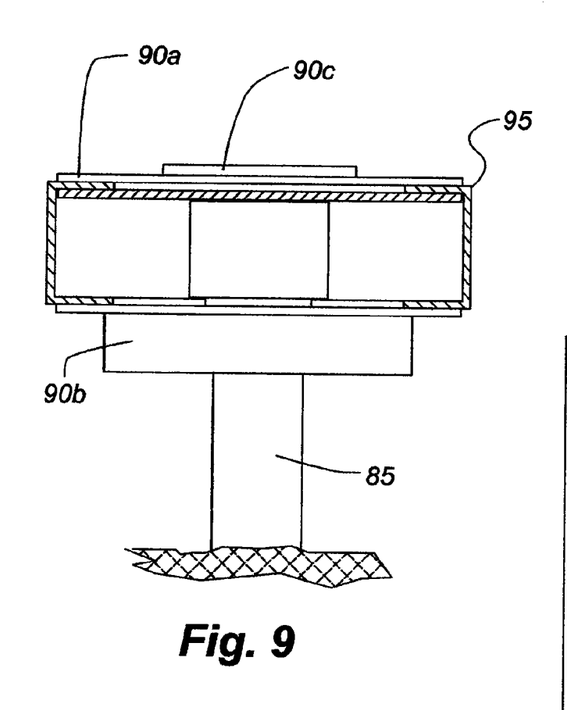
FIG. 9 is a cross-section view of the trailer with security device, viewed along line 9-9 in FIG. 4.

FIG. 9 depicts a cross-section view of the trailer 5 when looking towards the rear side of the lower security element 90*b*. As shown in FIG. 9, the lower security element 90*b* may extend below the lower elevation of the lock 80, thus preventing direct access to the lock 80 from the rearward side of the lower security element 90*b*. Limiting such access may enhance the effectiveness of the security device 40 by making it more difficult to tamper with the lock 80 from the lock's rearward side, especially with respect to attempts to tamper with the lock 80 using a drill or other tool.

Figure 10:
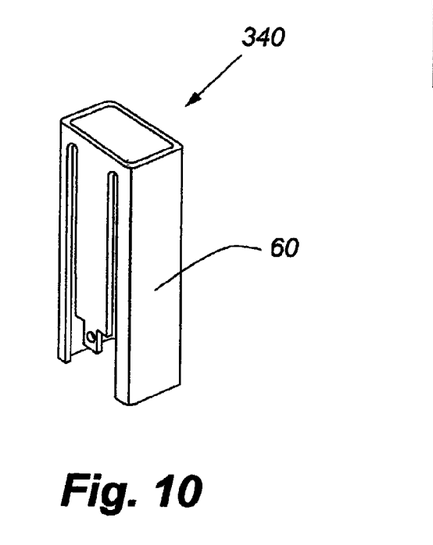
FIG. 10 is a perspective view of a second embodiment of a security device.
Figure 11:
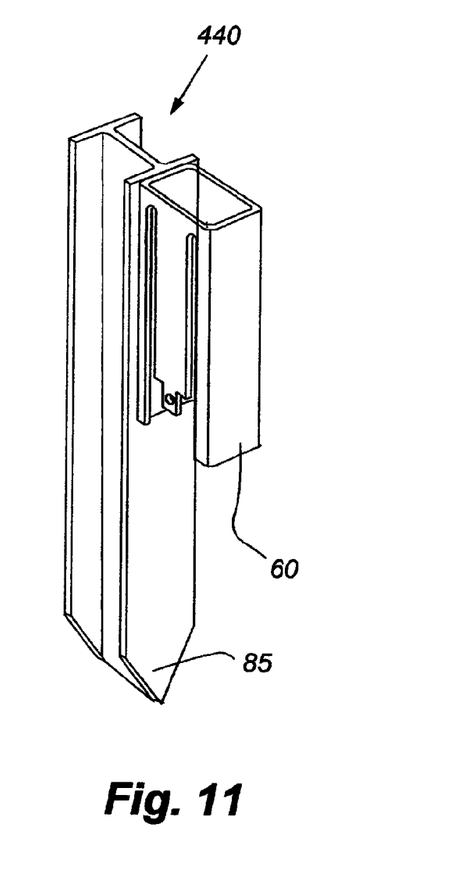
FIG. 11 is a perspective view of a third embodiment of a security device.
Figure 12:
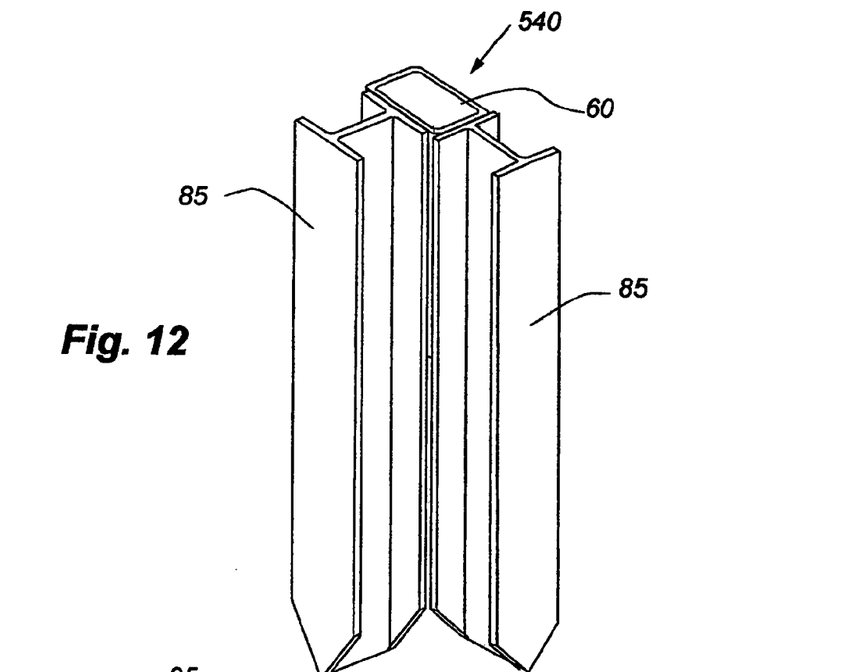
FIG. 12 is a perspective view of a fourth embodiment of a security device.

FIG. 10 depicts a second embodiment of the security device 340, in which like reference numbers are used for elements similar to the elements of the first embodiment. The second embodiment is generally similar to the first embodiment except for omission of the security post 85. FIG. 11 depicts a third embodiment of the security device 440, in which like reference numbers are used for elements similar to the elements of the first embodiment. The third embodiment is generally similar to the first embodiment except the security post 85 is joined to a sidewall of the security box 60 rather than the front wall. FIG. 12 depicts a fourth embodiment of the security device 540, in which like reference numbers are used for elements similar to the elements of the first embodiment. The fourth embodiment is generally similar to the first embodiment except two security posts 85 are joined to the security box 60, one to the front wall and the other to a sidewall. Although two security posts 85 are depicted in FIG. 12, more than two may be used. Further, the security posts 85 may be attached any of the walls 45 or the cover 65 of the security box 60.

Attaching and detaching any of the security devices from the trailer 5 will be described with reference to FIGS. 13-17. Although FIGS. 13-17 show the first embodiment of the security device 40, the sequence for attaching and detaching the security device from the trailer 5 is generally applicable to any of the embodiments of the security device. FIG. 13 depicts a perspective view of a trailer 5 showing a trailer coupler 35 joined to the trailer 5 using a trailer coupling member 15. As described above, the trailer coupler 35 may be joined to the trailer coupling member 15 using trailer coupler fasteners 110, such as bolts with nuts. With reference to FIG. 14, each coupler fastener 110 may be removed from the trailer coupling member 15 to disconnect the trailer coupler 35 from the trailer coupling member 15. For example, as shown in FIG. 14, the nut for the upper coupler fastener 110a is unthreaded from its respective bolt, thus allowing the bolt to be removed from the aligned holes 225 in the trailer coupling member 15 and the trailer coupler 35. After removal of the trailer coupler 35 from the trailer coupling member 15, the coupler fasteners 110 may then be rejoined to the trailer coupling member. For example, the bolt for the lower coupler fastener 110b has been reinserted through the aligned holes 225 in the trailer coupling member flanges 25 and its respective nut threaded onto it.

Figure 15:
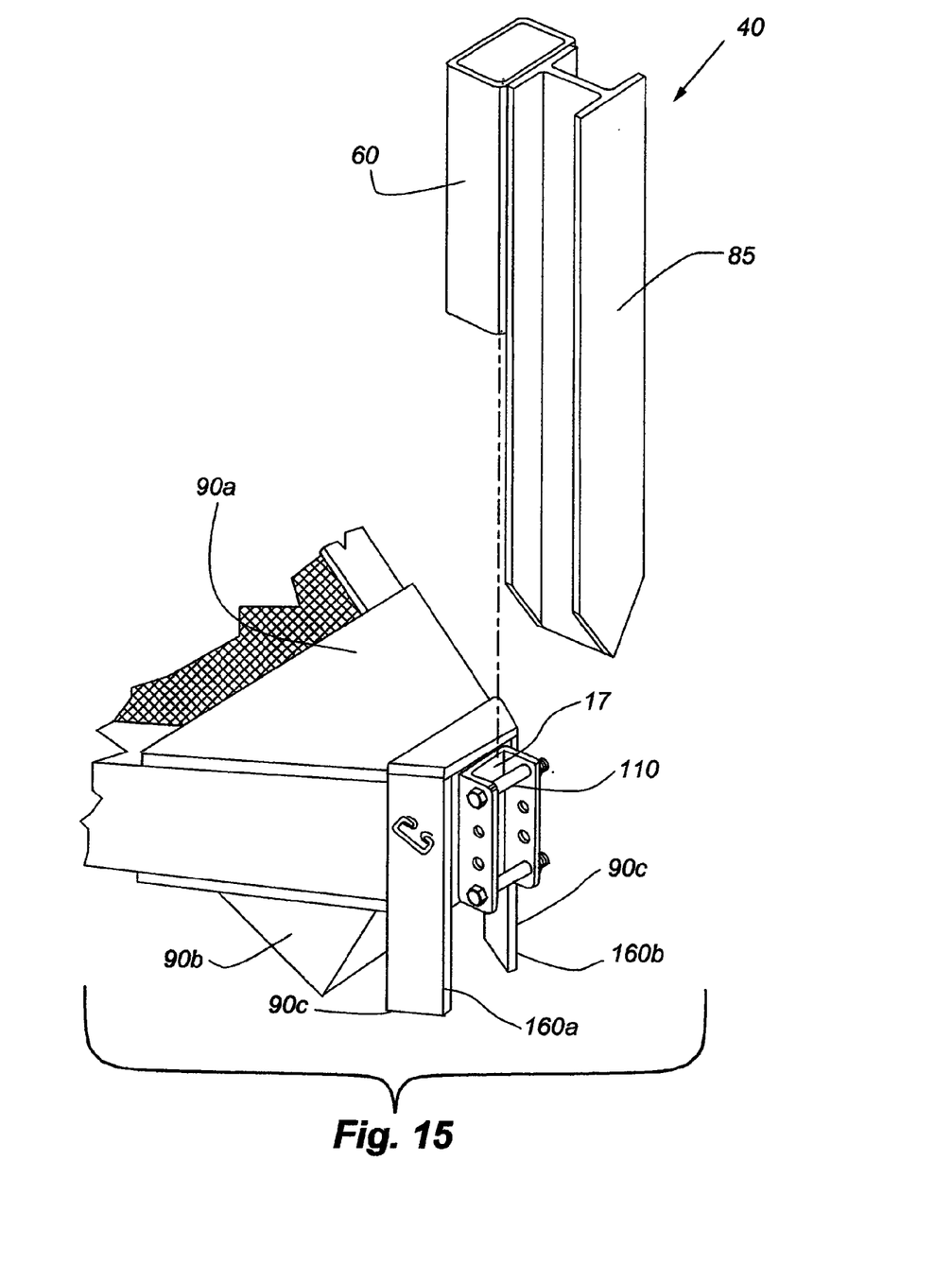
FIG. 15 is a perspective view of the front portion of the trailer of FIG. 13 showing a security device prior to attachment to the trailer.
Figures 16, 17:
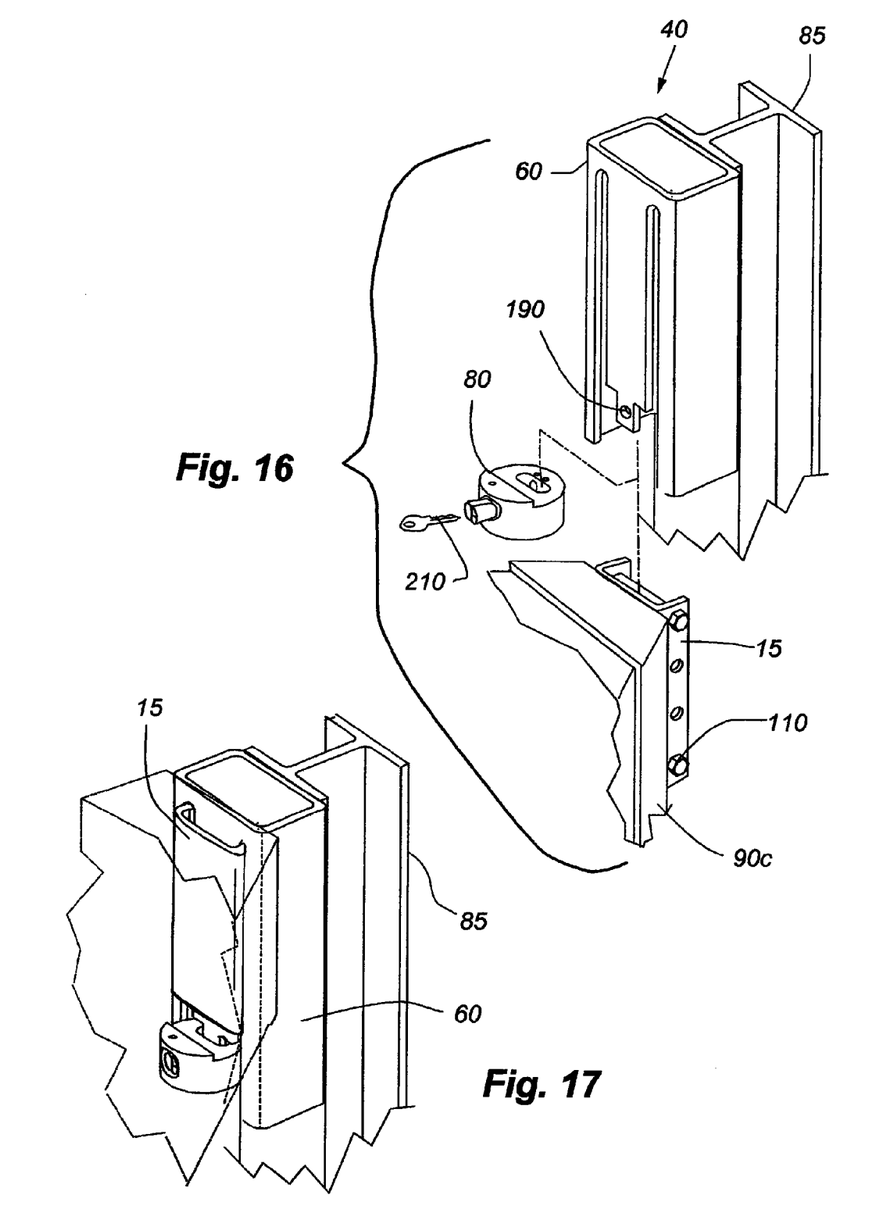
FIG. 16 is another perspective view of the front portion of the trailer of FIG. 13 showing the security device prior to attachment to the trailer.
FIG. 17 is a perspective view of the front portion of the trailer of FIG. 13 showing the front portion of the trailer in broken line and the security device attached to the trailer.

With reference to FIGS. 15 and 16, after rejoining the coupling fasteners 110 to the trailer coupling member 15, the security device 40 may be positioned to align the security box slots 50, 52 with the trailer coupling member flanges 25. The middle section 200b of the rear end wall 45b of the security box 60 may be positioned for receipt between the trailer coupling member web 17 and the coupler fasteners 110. Once positioned, the security device 40 may be moved downward relative to the trailer coupling member 15 to receive at least a portion of the trailer coupling member flanges 25 and the coupling fasteners 110 within the security box enclosed space 62 of the security box 60. Downward movement of the security device 40 may continue until the security box 60 reaches its rest position. Generally, the security box 60 is at its rest position when the security box cover 65 is positioned proximate the upper end of the trailer coupling member 15. Prior to or during downward movement of the security device 40, the stanchions 135 of the trailer 5 may be actuated to orient the front end of the trailer 5 into a position that facilitates joining the security device 40 to the trailer coupling member 15. For example, the front end of the trailer 5 may be moved into an orientation relative to the ground 150 to minimize the potential for the security post 85, if attached to the security box 60, to contact the ground 150 prior to the security box 60 being moved into its rest position.

After moving the security box 60 to its rest position, the lock 80 may be positioned relative to the security device 40 to align the lock pin 195 with the lock aperture 190. Once aligned, the lock pin 195 may be moved through the locking aperture 190 and rotated or otherwise moved into its locked position using the lock key 210 or other suitable tool. As shown, for example, in FIG. 17, a lower portion of the rear end wall 45b of the security box 60 may be received within a recess 220 formed in the lock body 215 to align the locking aperture 190 formed in the security box 60 with the locking pin 195 of the lock 80. As also shown, for example, in FIG. 17, access to the fastener holes 225 of the trailer coupling member 15 and the coupler fasteners 110 is generally prevented or otherwise denied by the security device 40. After locking the security device 40 to the trailer coupling member 15, the trailer stanchions 135 may be actuated to position the front frame 95 of the trailer 5 to another orientation relative to the ground 150. Such repositioning may be used to drive the security post 85 into the ground 150 as described in more detail above.

Removing the security device 40 from the trailer 5 may be performed by reversing the procedure for attaching the security device 40. For example, the trailer stanchions 135 may be activated to orient the trailer 5 to remove it from the ground 150, the lock 80 may be removed from the security device 40, the security box 60 of the security device 40 lifted off the trailer coupler channel 15, and so on. Although various steps and operations for joining the security device 40 to the trailer 5 are described in one possible order of operation, steps and operations may be rearranged, replaced, or eliminated without necessarily departing from the spirit and scope of the present invention.

Any of the components or portions of components for the trailer security system, including the security device, the security elements, and so on, may be formed from multiple parts joined together to create the component. The various parts may be integrally formed by methods such as cast molding, or may be joined by other methods such as by mechanical fastening, gluing or adhering, heat welding, and so on.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention described herein, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A trailer security system for use with a trailer including a trailer coupler channel including a web and including first and second flanges extending in a first direction from the web, each flange including a plurality of holes aligned with holes in the other flange for joining a trailer coupler to the trailer, the trailer security system comprising:
   an apparatus including a longitudinal axis and including four walls with each wall joined to at least two other walls, and the four walls defining a substantially enclosed space sized for receiving at least a portion of the first and second flanges;
   at least one of the four walls including parallel first and second slots defined by three wall sections: a first wall section, a second wall section including a tab having an aperture defined therein, the tab having a width that is less than a width of a remaining portion of the second wall section, and a third wall section, the first and third wall sections extending lower than the second wall section, each slot including a first closed end and a second open end, where a first side of the first slot extends substantially along the length of the first wall section to the closed end, a second side of the first slot extends from the closed end substantially along the length of the second wall section to the tab, a first side of the second slot extends substantially along the length of the third wall section to the closed end, a second side of the second slot extends from the closed end substantially along the length of the second wall section to the tab, and each slot including a longitudinal axis that substantially parallels the longitudinal axis of the apparatus and each slot providing access to the substantially enclosed space and sized to receive one of the first and second flanges therethrough;
   wherein receipt of the at least a portion of the first and second flanges into the substantially enclosed space substantially restricts access to at least one of the plurality of holes in each flange thereby substantially preventing attachment of a trailer coupler to the trailer coupler channel.

2. The trailer security system of claim 1, wherein the four walls further define a first opening to the substantially enclosed space.

3. The trailer security system of claim 2, wherein at least one of the first and second slots extends from the first opening.

4. The trailer security system of claim 2, wherein the four walls define a second opening to the substantially enclosed space with the second opening spaced apart from and substantially parallel to the first opening.

5. The trailer security system of claim 4, wherein the apparatus further includes a cover joined to at least one of the walls and substantially closing one of the first and second openings.

6. The trailer security system of claim 1, wherein the apparatus further includes a post extending from one of the four walls.

7. The trailer security system of claim 6, wherein one of the at least one of the walls including first and second slots is substantially parallel to another of the four walls, and the post extends from the another of the four walls.

8. The trailer security system of claim 1, further including a locking device selectively connectable to the apparatus.

9. The trailer security system of claim 8, wherein the locking device restricts removal of the apparatus from the trailer.

10. The trailer security system of claim 8, wherein the locking device includes a pin configured for receipt within the aperture defined in the tab of the second wall section.

11. The trailer security system of claim 1, further comprising a security element configured for attachment to the trailer.

12. The security system of claim 11, wherein the security element comprises at least two plates configured to form a wedge and attached to the trailer proximate the trailer coupler channel.

13. The security system of claim 11, wherein the security element comprises a plate fixedly attached to the trailer proximate the trailer coupler channel.

14. The security system of claim 11, wherein the security element comprises a U-shaped member fixedly attached to the trailer proximate the trailer coupler channel.

15. A trailer security system for use with a trailer including a coupling member having a plurality of holes for joining a trailer coupler to the trailer, the trailer security system comprising:
   an apparatus including a longitudinal axis and comprising at least four walls with each wall joined to at least two other walls, the four walls defining a substantially enclosed space sized for receiving at least a portion of the coupling member, and a first wall including parallel first and second slots, each slot including a first closed end and a second open end that is distal from the first closed end, each slot includes a longitudinal axis that substantially parallels the longitudinal axis of the apparatus and each slot providing access to the substantially enclosed space, and sized to receive at least a portion of the coupling member therethrough; and
   a post having an angled ground engaging end, the post coupled to an outer surface of a second wall of the apparatus, the second wall opposing or adjacent to the first wall and substantially parallel to the longitudinal axis of the apparatus,
   wherein receipt of the at least a portion of the coupling member into the substantially enclosed space substantially restricts access to at least one of the plurality of holes in the coupling member thereby substantially preventing attachment of a trailer coupler to the coupling member.

16. The trailer security system of claim 15, further comprising a post operatively associated with the apparatus.

17. The trailer security system of claim 15, wherein the apparatus further comprises a hole defined therein, wherein the hole is configured to receive at least a portion of a locking device.

18. A trailer security system for use with a trailer including a trailer coupler channel including a web and including first and second flanges extending in a first direction from the web, each flange including a plurality of holes aligned with holes in the other flange for joining a trailer coupler to the trailer, the trailer security system comprising:
   an apparatus including a longitudinal axis and including four walls with each wall joined to at least two other walls, and the four walls defining a substantially enclosed space sized for receiving at least a portion of the first and second flanges;
   at least one of the four walls including parallel first and second slots defined by three wall sections: a first wall section having a first wall lower end portion, a second wall section having a tab at a lower portion of the second wall section, the tab having a first upper endpoint and a second upper endpoint and a width that is less than a width of a remaining portion of the second wall section and an aperture defined therein, and a third wall section having a third wall lower end portion, the first and third wall sections extending lower than the second wall section and the slots separated by the second wall section, each slot including a first closed end and a second open end that is distal from the first closed end, each second open end defined by an outer endpoint and an inner endpoint, the outer endpoint of the first slot located at a most distal end of the first wall lower end portion, the inner endpoint of the first slot located at or parallel to the first upper endpoint of the tab, the outer endpoint of the second slot located at a most distal end of the third wall lower end portion, the inner endpoint of the second slot located at or parallel to the second upper endpoint of the tab, the second open end of each slot in communication with an open area of said at least one wall where said open area is defined by the first, second, and third wall sections, each slot including a longitudinal axis that substantially parallels the longitudinal axis of the apparatus and each slot providing access to the substantially enclosed space and sized to receive one of the first and second flanges therethrough;

wherein receipt of the at least a portion of the first and second flanges into the substantially enclosed space substantially restricts access to at least one of the plurality of holes in each flange thereby substantially preventing attachment of a trailer coupler to the trailer coupler channel.

19. The trailer security system of claim 18, wherein the aperture is configured to receive at least a portion of a locking device.

* * * * *